(12) United States Patent
Reddy

(10) Patent No.: US 7,897,052 B2  
(45) Date of Patent: *Mar. 1, 2011

(54) METHOD FOR REMOVING ARSENITE AND ARSENATE FROM WATER

(75) Inventor: Katta J. Reddy, Laramie, WY (US)

(73) Assignee: University of Wyoming, Laramie, WY (US)

( * ) Notice: Subject to any disclaimer, the term of this patent is extended or adjusted under 35 U.S.C. 154(b) by 924 days.

This patent is subject to a terminal disclaimer.

(21) Appl. No.: 10/572,445

(22) PCT Filed: Sep. 17, 2004

(86) PCT No.: PCT/US2004/030491

§ 371 (c)(1), (2), (4) Date: Mar. 15, 2007

(87) PCT Pub. No.: WO2005/028376

PCT Pub. Date: Mar. 31, 2005

(65) Prior Publication Data

US 2007/0262023 A1 Nov. 15, 2007

Related U.S. Application Data

(60) Provisional application No. 60/504,329, filed on Sep. 19, 2003.

(51) Int. Cl.  
C02F 1/28 (2006.01)  
C02F 101/10 (2006.01)

(52) U.S. Cl. ......... 210/681; 210/688; 210/911; 210/912; 423/35; 423/604

(58) Field of Classification Search ......... 210/681  
See application file for complete search history.

(56) References Cited

U.S. PATENT DOCUMENTS

| | | | |
|---|---|---|---|
| 4,913,808 A | 4/1990 | Haque | |
| 5,137,640 A | 8/1992 | Poncha | |
| 5,149,437 A | 9/1992 | Wilkinson et al. | |
| 5,348,662 A | 9/1994 | Yen et al. | |
| 5,556,545 A | 9/1996 | Volchek et al. | |
| 6,197,193 B1 | 3/2001 | Archer | |
| 6,861,002 B2 * | 3/2005 | Hughes | 210/681 |
| 7,235,179 B2 * | 6/2007 | Reddy | 210/670 |
| 7,244,359 B1 * | 7/2007 | Teter et al. | 210/683 |
| 7,744,846 B2 * | 6/2010 | Deevi et al. | 423/604 |
| 2001/0051103 A1 | 12/2001 | Seo et al. | |

* cited by examiner

*Primary Examiner* — Peter A Hruskoci  
(74) *Attorney, Agent, or Firm* — Emery L. Tracy

(57) ABSTRACT

A method for removing arsenite and arsenate from water is provided. The method comprises reacting the water with cupric oxide (CuO) particles for a predetermined time and filtering the reacted water. A system for removing arsenite and arsenate from liquids is also provided.

6 Claims, 2 Drawing Sheets

Schematics of arsenic removal from contaminated water.

Fig. 1. Schematics of arsenic removal from contaminated water.

Basic Filter Plant Design

Block Filter Design

METHOD FOR REMOVING ARSENITE AND ARSENATE FROM WATER

The present application is a continuation of pending provisional patent application Ser. No. 60/504,329, filed on Sep. 19, 2003, entitled "System and Method for Removing Arsenite and Arsenate From Water".

BACKGROUND OF THE INVENTION

1. Field of the Invention

This invention relates generally to a system and method for removing arsenite and arsenate from water and, more particularly, the invention relates to a system and method for removing arsenite and arsenate from water which reacts arsenic contaminated water with cupric oxide (CuO) particles for a predetermined time.

2. Description of the Prior Art

Arsenic is a naturally occurring substance found in a variety of combined forms in the earth. Arsenic contamination of drinking water has been reported from many parts of the world. The United States Environmental Protection Agency (EPA) has stated that arsenic in drinking water causes cancer in humans and that the amount of arsenic in water at the current allowed concentration may equal that caused by smoking cigarettes.

Arsenic is a Group 5A nonmetal with the more common valences of −3, 0, +3 and +5. Arsenite ($As^{+3}$) and arsenate ($As^{+5}$) are the most common forms found in drinking water and wastewater streams. In some arsenic affected areas, substitution of drinking water source by a safe and easily available one can be very expensive. In order to meet the maximum contaminant level (MCL) for human drinking water, irrigation water, livestock and wildlife watering, and aquatic life, the arsenic must be removed to meet the safe level. In fact, arsenic removal may be a more appropriate water supply option in these situations.

Therefore, water providers have a need for an economical safe method to remove arsenic from drinking water. Further, residential homes obtaining water from wells have a need for a low cost, safe, and efficient point of entry or point of use arsenic removal system.

In the past, there have been methods for removal of arsenic including the following: (1) adsorption onto activated alumina within a fixed bed contactor; (2) complexing arsenic with hydrous metallic floc, previously aluminum and iron hydroxides or oxyhydroxides, in conventional water treatment plants; (3) sieving the metal from water by membrane technologies such as reverse osmosis; and (4) electrodynamic processes such as electrodialysis.

Unfortunately, most conventional methods for arsenic removal have difficulties of removing arsenite ($As^{+3}$). Even though certain techniques are fairly successful on large municipal supplies, they are not practical for residential application because of space requirements, the use of dangerous chemicals, frequent monitoring, and expense. In fact, each of these methods require highly skilled personnel for operation and maintenance on an ongoing basis rendering them unsuitable suitable for residential use at point of entry.

The two most common techniques for residential water correction have been reverse osmosis (RO) and activated alumina. Activated alumina requires the use of caustic chemicals and a very large volume for the high flow rates available with this invention. RO is no longer certified as an arsenic removal technique because of its inability to reduce arsenite ($As^{+3}$) significantly.

SUMMARY

The present invention is a method for removing arsenite and arsenate from water. The method comprises reacting the water with cupric oxide (CuO) particles for a predetermined time and filtering the reacted water.

The present invention also includes a system for removing arsenite and arsenate from water. The system comprises water contaminated with arsenic, cupric oxide (CuO) particles added to the contaminated water, a filter for filtering the CuO/water.

DETAILED DESCRIPTION OF THE PREFERRED EMBODIMENTS

Preparation of Cupric Oxide

Figure 1:
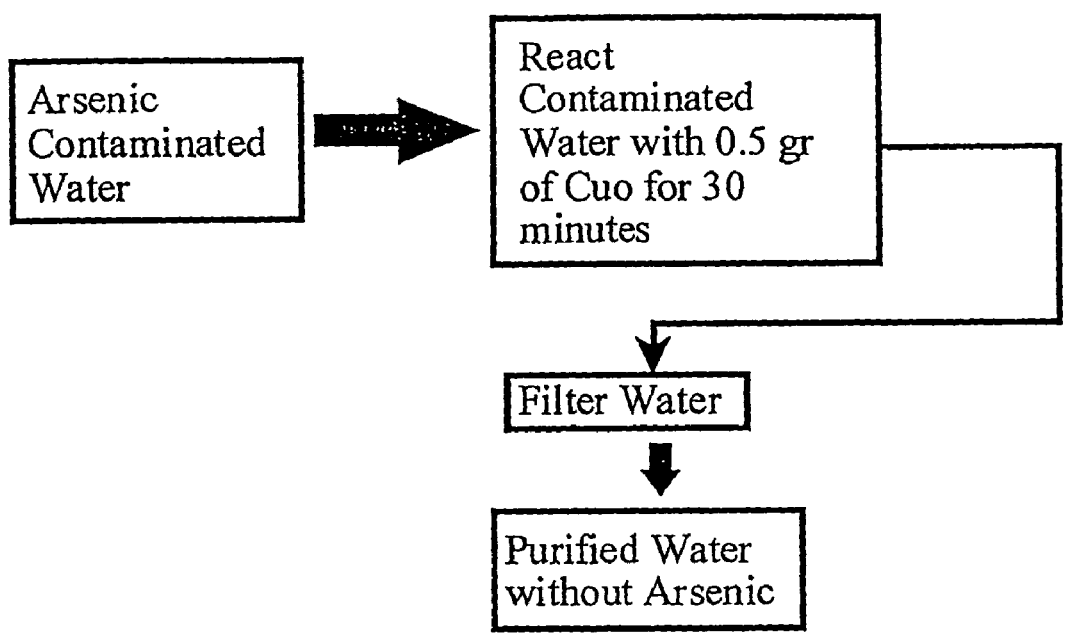
FIG. 1 is a schematic view illustrating arsenic removal from contaminated water, in accordance with the present invention.

Proposed method uses inexpensive solid particles and removes arsenite and arsenate from water. Removal kinetics are rapid, method is simple, and process does not produce harmful by products. Reduces arsenic species from water to lower than the EPA's required ten (10) µg/L for human drinking water. We conducted experiments with (pH of 6.0) and without (pH between 7.5-8.5) adjusting the pH of the system.

When sodium hydroxide reacts with copper chloride, copper hydroxide is formed. When copper hydroxide is left in the room temperature for a day, it precipitates as cupric oxide.

CuO is washed, filtered, dried, and then grounded to fine powder. This lab prepared CuO is used to remove arsenic from water.

Preparation of Standards

Arsenite standards were prepared using sodium arsenite salt ($NaAsO_2$).

Arsenite standards of 1 ppm, 500 ppb, 250 ppb, 100 ppb, and 10 ppb were prepared using 1000 ppm of arsenite standard.

Arsenate standards were prepared using sodium arsenate salt ($Na_2AsO_4$).

Arsenate standards of 1 ppm, 500 ppb, 250 ppb, 100 ppb, and 10 ppb were prepared using 1000 ppm of arsenate standard.

Sodium sulfate salt ($Na_2SO_4$) was used to prepare 1,250 ppm, 1,000 ppm, 250 ppm, and 50 ppm of sulfate standards.

Experiments

Arsenic standard solutions were prepared and 50 ml of each standard solution was reacted with 0.5 grams of CuO in a conical flask. Conical flasks were kept on a mechanical shaker and reacted for a predetermined time. After the reaction, solutions were filtered and analyzed for arsenic using ICP Mass Spectrometry.

Results

1. Arsenite reacted with 0.50 grams of CuO particles.

| As standards (in ppb) | Total arsenic conc. before reaction | Total arsenic conc. after reaction | % Removed |
|---|---|---|---|
| 10 | 8 | −0.3 | 100 |
| 100 | 87 | −0.1 | 100 |
| 250 | 217 | −0.3 | 100 |
| 500 | 426 | −0.1 | 100 |
| 1000 | 868 | −0.1 | 100 |

2. Arsenate reacted with 0.25 grams of CuO particles.

| As standards (ppb) | Total arsenic conc. before reaction (ppb) | Total arsenic conc. after reaction (ppb) | % Removed |
|---|---|---|---|
| 10 | 8 | 0 | 100 |
| 100 | 87 | 0.3 | 99.65 |
| 250 | 217 | 24.8 | 88.57 |
| 500 | 426 | 85.1 | 80.02 |
| 1000 | 868 | 210.7 | 75.80 |

3. Five hundred (500) ppb of arsenite and different concentration of sulfate with 0.5 grams of CuO particles.

| Sulfate conc. before reaction (ppm) | Sulfate conc. after reaction (ppm) | Total arsenic conc. before reaction (ppb) | Total arsenic conc. after reaction (ppb) | % Removed |
|---|---|---|---|---|
| 1070 | 1055 | 540.9 | 1.2 | 99.77 |
| 1303 | 1293 | 555.8 | 4.1 | 99.26 |
| 269 | 260 | 544.9 | 2.7 | 99.50 |
| 64.2 | 57.9 | 610.4 | 0.1 | 99.98 |

4. Arsenate reaction with 0.5 grams of CuO particles.

| Arsenate standards (ppb) | Total arsenic conc. before reaction (ppb) | Total arsenic conc. after reaction (ppb) | % Removed | $Cu^{2+}$ conc. after reaction (ppb) |
|---|---|---|---|---|
| 10 | 14 | 0 | 100 | 3426 |
| 100 | 82 | 1 | 98.78 | 779 |
| 250 | 257 | 0 | 100 | 325 |
| 500 | 428 | 0 | 100 | 340 |
| 1000 | 837 | 0 | 100 | 124 |

5. Five hundred (500) ppb of arsenate and different concentration of sulfate reacted with 0.5 grams of CuO particles.

| Sulfate conc. before reaction (ppm) | Sulfate conc. after reaction (ppm) | Total arsenic conc. before reaction (ppb) | Total arsenic conc. after reaction (ppb) | % Removed | $Cu^{2+}$ conc. after reaction (ppb) |
|---|---|---|---|---|---|
| 1277.3 | 1268.6 | 430 | 1 | 99.76 | 206 |
| 263.6 | 244.6 | 430 | 0 | 100 | 10 |
| 50.3 | 42.7 | 352 | 0 | 100 | 10 |

6. Arsenate (125 ppb) spiked from the water collected from four different streams and reacted with 0.5 grams of CuO particles.

| Streams | Total arsenic conc. before reaction (ppb) | Total arsenic conc. after reaction (ppb) | % Removed | $Cu^{2+}$ conc. before reaction (ppb) | $Cu^{2+}$ conc. after reaction (ppb) | Sulfate conc. after reaction (ppm) |
|---|---|---|---|---|---|---|
| Oregon | 146.3 | 2.9 | 98.00 | 9.1 | 17.5 | 628.0 |
| Six Mile Drain | 125.2 | 0 | 100 | 0.0 | 36.3 | 740.0 |
| Casper | 119.0 | 0 | 100 | 0.0 | 33.1 | 1439.0 |
| Bait's | 117.8 | 0 | 100 | 0.0 | 15.3 | 573.0 |

7. Arsenite (150 ppb) spiked from the water collected from four different streams and reacted with 0.5 grams of CuO particles.

| Streams | Total arsenic conc. before reaction (ppb) | Total arsenic conc. after reaction (ppb) | % Removed | $Cu^{2+}$ conc. before reaction (ppb) | $Cu^{2+}$ conc. after reaction (ppb) | Sulfate conc. after reaction (ppm) |
|---|---|---|---|---|---|---|
| Oregon | 156.5 | 25.7 | 83.57 | 4.0 | 15.4 | 628.0 |
| Six Mile Drain | 149.6 | 0 | 100 | 2.9 | 11.9 | 740.0 |
| Casper | 143.6 | 0 | 100 | 4.4 | 50.2 | 1439.0 |
| Bait's | 142.5 | 0 | 100 | 0.6 | 14.6 | 573.0 |

The following arsenic removal data from natural waters without adjusting the pH show that arsenic can be removed from water with the invention of the present application.

| Sample | Arsenate Before Reaction (µg/L) | Arsenate After Reaction (µg/L) | % Removed |
|---|---|---|---|
| B-1 | 133.6 | 0.7 | 99.4 |
| B-3 | 141.5 | 0.7 | 99.5 |
| B-5 | 136.7 | 1.0 | 99.2 |
| B-7 | 139.7 | 0.9 | 99.3 |
| B-2 | 121.9 | 1.6 | 98.6 |
| B-4 | 117.0 | 1.3 | 98.8 |
| B-6 | 119.0 | 5.4 | 95.4 |
| B-8 | 121.0 | 0.3 | 99.7 |

In the present invention, three possible mechanisms have been found for effective removal of arsenic species by the CuO particles under natural conditions; 1) the pH at which ZPC for CuO particles in water is at higher pH than any other sorbents therefore, these particles may have higher affinity of arsenic species; 2) arsenite and arsenate have appropriate atomic size so that these atoms move into the structure of CuO particle; and/or 3) $Cu^{2+}$ dissolved from CuO particles probably complexes with arsenite in the pH range of 7-9, which is in turn adsorbed by the CuO particles. The data suggests that CuO particles can lower both arsenite and arsenate in water, under different conditions, to well below the required contaminant limit of 10 µg/L for human drinking water.

The method of the present invention is rapid and does not require pH adjustments. Other common ions of water do not affect the removal of arsenic species. In addition, the method is simple, effective, and inexpensive. Also, the method produces no harmful by-products. The method of the present invention has potential to address serious health and environmental problems facing both under developed and developed nations by improving the quality of drinking water they depend upon.

CONCLUSIONS

1. Arsenate and arsenite showed a strong affinity to CuO in water.
2. Arsenate and arsenite can be removed from water in the presence of high sulfate concentrations when 0.5 grams of CuO is used.
3. CuO has efficiently removed spiked arsenate and arsenite from the natural waters.
4. CuO can be used efficiently to remove arsenic species from drinking water and/or contaminated water without adjusting the natural pH.

Figure 2:
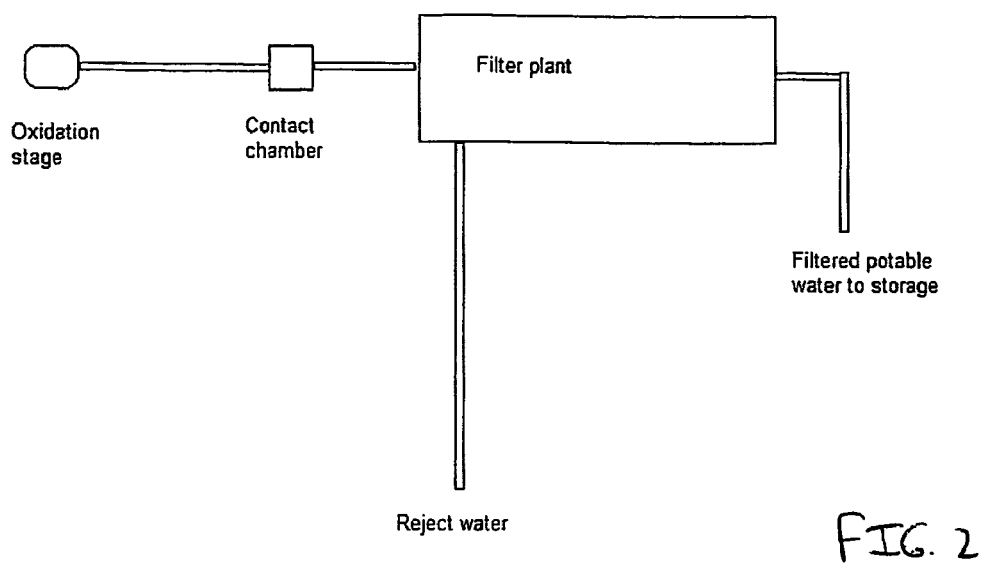
FIG. 2 is a schematic view illustrating a filter plant design, constructed in accordance with the present invention.

A system for removing arsenite and/or arsenate from tap water, as illustrated in FIG. 2, comprises an oxidation stage for converting arsenic in the liquid to $As^3$ and/or $As^5$. A cupric oxide contact chamber is disposed downstream from the oxidation stage for receiving cupric oxide and for mixing cupric oxide with the liquid containing $As^3$ and/or $As^5$. A filter is disposed downstream from the contact chamber for removing arsenic complex or complexes from the liquid. The system can further comprise an activated carbon chamber for receiving the filtered liquid and a mix bed ion exchange medium for receiving the carbon filtered liquid.

Figure 3:
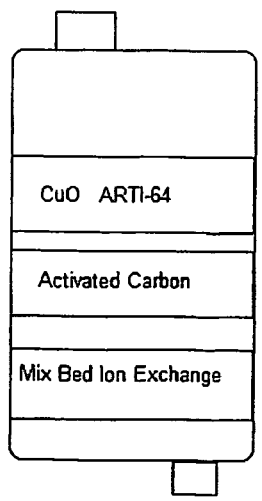
FIG. 3 is a schematic view illustrating a filter design, constructed in accordance with the present invention.

A treatment and filter system for removing arsenite and/or arsenate from water, as illustrated in FIG. 3, comprises a cupric oxide contact section for reacting cupric oxide with arsenic contained in a water stream to produce arsenite and/or arsenate. An activated carbon filter is disposed downstream of the cupric oxide contact section. A mixed bed ion exchange section is dispensed downstream of the activated carbon filter and wherein the cupric oxide contact section, activated carbon filter, and mixed bed ion exchange are housed within a housing that is adapted to connect to a water source. The housing of the treatment and filter system is sufficiently compact to enable the system to be secured to the outlet of a household water faucet.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A method for removing arsenite and arsenate from liquids through adsorption, the method comprising:
   creating cupric oxide (CuO) particles by reacting sodium hydroxide with copper chloride, forming copper hydroxide, placing the copper hydroxide in room temperature for a predetermined time, precipitating the copper hydroxide into cupric oxide, simultaneously filtering and washing the cupric oxide (CuO) particles, drying the cupric oxide (CuO) particles, and grounding the cupric oxide (CuO) particles into a desired particle size;
   reacting the liquid with cupric oxide (CuO) particles for a predetermined time;
   absorbing the arsenite and arsenate on the cupric oxide (CuO) particles; and
   filtering the reacted liquid to remove arsenite, arsenate, and the cupric oxide (CuO) particles.

2. The method of claim 1 wherein the filtered liquid has an arsenic concentration of less than approximately 10 µg/L.

3. The method of claim 1 wherein the amount of CuO particles is approximately 0.5 grams.

4. A method for removing arsenite and arsenate from liquids through adsorption, the method comprising:
   reacting sodium hydroxide with copper chloride;
   forming copper hydroxide;
   placing the copper hydroxide in room temperature for a predetermined time;
   precipitating into cupric oxide (CuO);
   simultaneously filtering and washing the CuO particles;
   drying the CuO particles;
   grounding the CuO particles into a desired particle size;
   providing a liquid having a pH of between approximately 6.0 and approximately 9.0;
   reacting the liquid with cupric oxide (CuO) particles for a predetermined time;
   absorbing the arsenite and arsenate on the cupric oxide (CuO) particles; and
   filtering the reacted liquid to remove arsenite, arsenate, and the cupric oxide (CuO) particles.

5. The method of claim 4 wherein the filtered liquid has an arsenic concentration of less than approximately 10 µg/L.

6. The method of claim 4 wherein the amount of CuO particles is approximately 0.5 grams.

* * * * *

UNITED STATES PATENT AND TRADEMARK OFFICE
CERTIFICATE OF CORRECTION

PATENT NO.         : 7,897,052 B2
APPLICATION NO.    : 10/572445
DATED              : March 1, 2011
INVENTOR(S)        : Katta J. Reddy It is certified that error appears in the above-identified patent and that said Letters Patent is hereby corrected as shown below:

Column 6, line 20, remove the term --absorbing-- and replace with --adsorbing--.

Column 6, line 42, remove the term --absorbing-- and replace with --adsorbing--.

Signed and Sealed this
Twelfth Day of February, 2013

Teresa Stanek Rea
*Acting Director of the United States Patent and Trademark Office*